United States Patent [19]
Yasrebi et al.

[11] Patent Number: 5,927,379
[45] Date of Patent: Jul. 27, 1999

[54] INFILTRATION METHOD FOR PRODUCING SHELLS USEFUL FOR INVESTMENT CASTING

[75] Inventors: Mehrdad Yasrebi, Clackamas; David Howard Sturgis, Boring; William Warren Kemp, Milwaukie; Mark Edwin Springgate, Portland, all of Oreg.; Douglas Gene Nikolas, Battleground, Wash.

[73] Assignee: PCC Structurals, Inc., Portland, Oreg.

[21] Appl. No.: 08/719,690

[22] Filed: Sep. 26, 1996

[51] Int. Cl.⁶ .................................. B22C 9/02; B22C 9/04
[52] U.S. Cl. ........................ 164/518; 164/519; 164/35; 164/516
[58] Field of Search ...................... 164/517, 518, 164/519, 35, 361, 516

[56] References Cited

U.S. PATENT DOCUMENTS

| | | |
|---|---|---|
| 2,703,913 | 3/1955 | Hinde et al. . |
| 3,967,003 | 6/1976 | Emblem et al. ............... 164/519 |
| 4,585,618 | 4/1986 | Fresnel et al. . |
| 4,925,492 | 5/1990 | Kelkar et al. . |
| 5,198,152 | 3/1993 | Liimatta et al. . |
| 5,304,031 | 4/1994 | Bose . |
| 5,407,001 | 4/1995 | Yasrebi et al. ............... 164/519 |
| 5,511,603 | 4/1996 | Brown et al. . |
| 5,630,465 | 5/1997 | Feagin ........................ 164/519 |
| 5,678,624 | 10/1997 | Sakurai ...................... 164/519 |

FOREIGN PATENT DOCUMENTS

| | | |
|---|---|---|
| 0383164 A1 | 8/1990 | Germany . |
| 1664451 | 7/1991 | U.S.S.R. ................... 164/519 |
| 809954 | 3/1959 | United Kingdom .......... 164/519 |

*Primary Examiner*—Patrick Ryan
*Assistant Examiner*—I.-H. Lin
*Attorney, Agent, or Firm*—Klarquist Sparkman Campbell Leigh & Whinston, LLP

[57] ABSTRACT

Methods and compositions for forming shells for investment casting and methods for casting metal articles using the shells are described. One embodiment of the method comprises serially immersing a pattern in at least one, and perhaps several different slurries, each of which slurries comprises refractory material and from about 0 to about 30 volume percent inorganic binder. This forms a facecoat and plural refractory backup layers about the pattern, the facecoat and at least one backup layer defining a shell. The facecoat and/or the shell is then infiltrated with a binder. Infiltrating the shell with a binder is a key feature of the present invention. Infiltration refers to any process whereby a binder can be introduced into the facecoat and/or the subsequent layers built up about the shell. One method of infiltrating the facecoat and/or layers with binder comprises immersing the pattern having refractory material into a slurry comprising a binder, including inorganic binders, organic binders, and mixtures thereof. The pattern then is separated from the shell, forming a shell having an internal void in the shape of an article to be cast. Molten metal is then introduced into the void and allowed to solidify.

51 Claims, 6 Drawing Sheets

INFILTRATION METHOD FOR PRODUCING SHELLS USEFUL FOR INVESTMENT CASTING

FIELD OF THE INVENTION

This invention concerns methods and compositions for producing shells for investment casting.

BACKGROUND OF THE INVENTION

Dipcoating methods have been used for years to produce shells for investment casting. The first step in the conventional dipcoating process involves preparing slurries comprising suspensions of refractory materials, such as ceramic particles. The second major step requires serially dipping patterns, such as wax patterns or patterns comprising polymeric materials produced by stereolithography, into one or more refractory slurries. This builds up refractory material on the outside surface of the pattern to form a shell in the shape of the pattern.

The slurry-forming step requires preparing multicomponent slurries which include both a flour (i.e., refractory materials) and a binder system. With known methods the binder system includes at least one inorganic binder. The slurry system can be either an aqueous-based system, or a nonaqueous-based system. For aqueous-based systems, the inorganic binder generally comprises nanometer-sized colloidal silica.

Binder particles in a slurry may permanently bond together which, over a period of time, renders the slurries unusable. Binder particle bonding is facilitated by particle drying at the air-slurry interface. Several factors contribute to binder particles coming to air-slurry interfaces. For example, production slurries generally are open to the air and are continuously being mixed. Moreover, air often is continuously bubbled through the slurries to agitate the suspensions. These actions produce air-slurry interfaces, and hence facilitate binder-particle bonding. Once patterns or patterns coated with refractory layers are dipcoated they are removed from the slurry. Excess slurry is allowed to drip off of the shell and back into the container housing the slurry. This also promotes the formation of large air-slurry interfaces. The consequence is that slurries lose their useful properties over time, which is referred to in the industry as "slurry aging" or just "aging".

Besides aging due to the formation of slurry-air interfaces, the different refractory materials used in the slurry also may cause differential slurry aging. For example, yttria-based slurries age very rapidly and may become completely useless within less than a few hours. Alumina-based slurries age slower, and in a similar environment may last a few months.

In aqueous slurries, the soluble species originating from each component of a slurry may specifically adsorb on the surface of silica binder particles. By modifying the surface properties of silica particles, this process can cause aging over time. The degree of interaction among different components of a slurry and the binder particles differs from one slurry to another. For example, Horton et al.'s U.S. Pat. No. 4,947,927 illustrates that in yttria-based slurries, slurries age and become useless in less than a few hours. Yasrebi et al.'s U.S. Pat. No. 5,407,001 teaches that if the yttria used to form yttria-based slurries is fused with a few percent of zirconia, then the solubility of yttria decreases and slurries containing such materials may be used for a period of greater than about a week. The extent of interaction between slurry components and binder is even less in slurries made with less soluble materials, such as alumina, zircon, or fused silica. These slurries can be prevented from aging for extended periods of time, such as months or even longer than a year if the slurries are kept in sealed containers.

In non-aqueous slurries silicon alkoxides often are used as binders. An increase in the pH of non-aqueous slurries as the result of dissolution of components normally reduces the lifetime of these slurries even more dramatically than for their aqueous counterparts. Similar to aqueous systems, the aging behavior of these slurries may differ depending on the amount of dissolution of components in the slurry. For example, yttria-based non-aqueous slurries age very rapidly and may become useless in less than a few hours, whereas alumina-based slurries age slower and in a similar environment may last a few weeks. On the other hand, in some slurries, such as zircon slurries, the pH increase is quite small and slurries may last for many months. Other non-silicon based alkoxides normally go through hydrolysis and condensation reactions very rapidly and age prematurely in the presence of even less reactive refractories such as zircon. For this reason, non-silicon based alkoxides have not been used as binders in the investment casting industry.

Each of the factors discussed above contributes to causing slurry aging. Methods continually are sought to reduce or eliminate slurry aging. One reason for this is that the slurries used to make shells commercially preferably are made in large quantities. It may take many months to use the entire contents of each slurry vessel. If the slurries do not have long shelf lives, they must be disposed of periodically.

Besides slurry aging, there are other problems associated with the conventional shell making process. Such problems include, but are not limited to, reactions between the metal and the shell during the casting process (referred to herein as metal-shell reaction) and undesirable mechanical properties in the shell itself. Concerning metal-shell reaction, the casting process requires first melting the metal and thereafter filling investment casting shells with the molten metal. Some of the metals cast by investment-casting methods are highly reactive. Titanium is an example of such a metal. Furthermore, the reactivity of most metals and metal alloys increases at the high temperatures at which metal articles are cast. The refractory particles used to form the shells therefore may react with the molten metal introduced into the shell. For example, silica binders can react with the molten metal. Silica binders therefore present two considerations. First, the binding properties of silica are the primary reason why conventional shell-making processes work as well as they do, and hence silica binders are an important component in most shell-making compositions. On the other hand, silica causes slurry aging over time. Moreover, silica generally is the least refractory component in a shell, and is the material most likely to react with the metal being cast.

There have been attempts to substitute higher-refractory non-silica binders for silica binders in investment casting slurries. These attempts have proven impractical for use in commercial processes. One reason for this is excessively rapid slurry aging.

The mechanical properties of a shell also are affected by the methods used for their production, as well as by the materials used to construct the shells. For example, green strength, which refers to the strength of the shell before it is fired (i.e., heated to elevated temperatures before being used to cast metals) is an important consideration. An adequate green strength is required to construct a shell around a pattern. An adequate green strength also is important to prevent the shell from cracking as the pattern about which the shell is constructed is separated from the shell. The green strength of a shell appears to correlate with the binder concentration in the slurry. For example, an increase in the concentration of colloidal silica increases the green strength, at least to a point. However, there is a maxima in the curve for green strength versus silica-binder concentration. This is referred to herein as the critical binder concentration, i.e., the binder concentration corresponding to the maxima in the green strength versus binder concentration curve. Shell strength generally decreases when the binder concentration exceeds the critical binder concentration.

High-temperature shell stability is another mechanical property of interest. If the shell deforms at high temperatures, such deformities will be manifested in the metal article being cast. Deformation of the shell at high temperatures is referred to herein as "shell creep" or just "creep." It currently is believed that the main cause of shell creep is the silica binder. Silica is an amorphous material which does not crystalize easily, and this is believed to contribute to shell creep at high temperatures.

Another problem associated with the investment casting process is separating the shell from the cast metal article once the casting process is complete. This is referred to as knockout. Obviously, the easier the shell is to remove from the cast metal article, the better. The need for adequate green strength directly opposes the need to have facile separation of the shell from the cast metal article. That is, for most shells increased green strength makes it more difficult to separate the shell from the cast metal article.

Based on the preceding discussion it is apparent that there is a need for methods and compositions that reduce the aging of slurries used in the investment casting industry. There also is a need to accomplish the goal of reduced slurry aging while maintaining or improving the important physical characteristics of the shell.

SUMMARY OF THE INVENTION

The present invention provides methods and compositions for making shells for investment casting. The method involves forming shells using a binder infiltration process that infiltrates shells with binder as the shell is being formed. This allows for the substantial elimination of inorganic binder from the slurries that are used to deposit refractory material on patterns during the shell-making process. Separating the inorganic binder from the production slurries containing refractory material substantially reduces slurry aging. Moreover, the infiltration process simultaneously maintains or improves the physical characteristics of shells produced by the method relative to shells produced by conventional methods using the same materials.

One embodiment of the method comprises immersing a pattern formed in the shape of a desired article into a first slurry comprising refractory material and from about 0 to about 30 volume percent inorganic binder based on the volume of the slurry. A refractory material is any material that has a high softening point, and a high melting point. A primary example, without limitation, of a refractory material used to form investment casting slurries is metal oxides. After being immersed in a slurry, the pattern is removed from the slurry vessel. Stucco is then applied to the ceramic material, and the pattern with coating material is allowed to dry.

The first immersion step forms a facecoat about the pattern. The pattern having the facecoat is then repeatedly immersed (referred to herein as serially immersing) into the same or different slurries used to form the facecoat, wherein such slurries comprise refractory material and from about 0 to about 30 volume percent inorganic binder based on the volume of the slurry. The stuccoing and drying steps also are repeated. The steps of serially immersing patterns in slurries, followed by the steps of stuccoing and drying, form patterns coated with a refractory facecoat and plural backup refractory layers. The refractory material when deposited about the pattern forms a porous structure. Thus, the facecoat has a porosity. Moreover, the facecoat and at least one backup refractory layer, and more typically plural such backup layers, define a porous shell.

The next method step involves infiltrating at least the facecoat or the porous shell with binder. It should be understood that the infiltration step can involve infiltrating the facecoat with binder solely, infiltrating the shell once with binder after formation of one of the plural backup refractory layers, infiltrating the facecoat and thereafter the shell with binder following the formation of one or more of the plural backup refractory layers, infiltrating the facecoat and then the entire shell with binder after formation of all of the backup layers, or infiltrating the facecoat with binder and then the entire shell with binder following formation of each of the plural backup layers.

One objective of the present invention is to reduce the aging of slurries, which can be accomplished by removing all or a major portion of the inorganic binder from the slurries used to form the facecoat and backup layers. However, the slurries must still be able to deposit refractory material onto the pattern and have such material form a cohesive structure about the pattern. This can be accomplished by using slurries comprising inorganic binder in amounts less than used in conventional approaches, or by using slurries comprising organic binder, such as an emulsion binder, in amounts effective for forming a cohesive shell about the pattern, or by using slurries comprising (1) organic binder and (2) inorganic binder in amounts less than used in conventional approaches.

The present method can be practiced with virtually any slurry used to form shells by investment casting, and hence should not be construed for use with particular refractory materials or binders. However, solely by way of example, a partial list of suitable refractory materials used to form investment casting slurries includes: metal oxides, such as alumina, yttria, zirconia, silica, alumino silicates, zircon, and combinations of such materials; non-oxides, such as silicon carbide, tungsten metal, or mixtures of such materials; and mixtures of metal oxides and non-oxides. Examples, without limitation, of suitable inorganic binders include metal oxides, such as nano-size colloidal silica, nano-size colloidal yttria, nano-size colloidal alumina and nano-size colloidal zirconia, metal salts, metal alkoxides, inorganic polymers, polysilicates, alkylsilicates, and mixtures thereof. When alkyl silicate binders are used, the method may further comprise the step of exposing the shell to gelling agents, such as ammonia, following the infiltration step. An example of a class of suitable organic binders is emulsion binders.

Infiltrating the facecoat and/or backup refractory layers is an important aspect of the invention. This method step can be accomplished in several ways. A first infiltration method involves immersing the pattern having refractory material, such as at least the facecoat, into a binder system. As used herein, "binder system" refers to any material that includes a binder, such as, but without limitation, neat liquid binders, slurries comprising suspensions of binders, and/or emulsions comprising a binder. The binder system can comprise an inorganic binder, an organic binder, particularly emulsion binders, and mixtures thereof. The step of infiltrating generally comprises immersing the pattern having refractory material into a binder system for a period of at least about 10 minutes. Another method for determining the amount of binder infiltrated into the porous structure defined by the refractory material comprises immersing the pattern having refractory material into a binder system for a period of time sufficient to infiltrate from about 10 to about 100 volume percent of the porosity with binder. One method for determining to what extent the pore volume of the facecoat and/or shell is infiltrated with binder is the Archimedes method, although there also are other methods for determining the percent of the pore volume infiltrated with binder. An alternative process for practicing the infiltration step comprises subjecting the pattern having refractory material to a pressure less than ambient while infiltrating the facecoat and/or the shell comprising the facecoat and at least one refractory backup layer with the binder.

The lifetime of slurries used to form shells for investment casting can be substantially increased by eliminating, or substantially eliminating, inorganic binder from the slurries used to deposit refractory material on the pattern. One method for monitoring the useful lifetime of a slurry is to periodically check the viscosity of the slurry, or a component of the slurry, such as the binder system. With conventional systems, the viscosity of the slurry gradually or rapidly increases, depending upon the various factors, over time until the slurry is no longer useful for forming shells. One benefit of practicing the present method is to substantially increase the lifetime of a slurry. The viscosity of investment casting slurries made to practice the present invention increases at a much slower rate relative to conventional slurries made having the same components but including conventional amounts of inorganic binder. The solids concentration should be considered in evaluating viscosity because it is common in the industry to dilute refractory slurries with water over time, which changes the solids concentration as well as the viscosity of the slurry and/or its components. Thus, the method of the present invention allows the formation of slurries which include a binder or a mixture of binders wherein the viscosity of the binder or mixture of binders, at a constant solids concentration, increases less rapidly than with conventional systems.

Another method for determining whether a slurry has aged too much for continued use is to monitor the green strengths of shells made using the slurry. As slurries age, the green strength of shells made with such slurries decreases until such time as the slurries can no longer be used to form shells having adequate green strengths for casting metal articles. The present method allows investment casting slurries to be used to form shells having adequate green strengths for a longer period of time than conventional slurries having the same components except for the amount of inorganic binder added to the slurry. Furthermore, whereas particular green strengths (generally measured in psi) can be provided for shells made using specific investment casting slurries, it is difficult to provide a range of green strengths that would apply to all investment casting shells that can be made using the binder infiltration method of the present invention. Instead, it can be said that the green strength of a shell made using a particular investment casting slurry and the present infiltration process remains adequate for a longer period of time than does the green strengths of shells made with the same materials where the entire amount of inorganic binder used to form the shell is added to the investment casting slurry. More specifically, it currently is believed that shells made by the present method will, over a period of about a month, retain 80% or more of the green strength that shells would exhibit immediately after forming the investment casting slurry (referred to as the initial green strength). By way of comparison, the green strength of articles made by conventional methods over the same period will retain substantially less than 80% of the initial green strength over a period of about a month.

Virtually all methods currently used to form shells for investment casting use silica binders. Silica binder particles tend to bind together, which increases the viscosity and eventually renders slurries containing such particles unusable. However, if the silica binder is removed from the slurry containing refractory material, the lifetime of the slurry can be substantially increased. Moreover, there may be certain situations where it is preferable to use binders other than silica, but for various reasons silica is still required. For example, slurries made with non-silica binders generally age much faster than slurries made using silica binders. Furthermore, some non-silica binders do not age rapidly, but also do not have sufficient binding capability at room temperature to be used successfully as binders. By infiltrating the facecoat and/or backup layers using a binder system, shells can be made without using silica binders. Thus, the present invention provides a method for forming shells for investment casting using non-silica binders. The method comprises immersing the pattern in a first slurry comprising refractory material and from about 0 to about 30 volume percent inorganic binder based on the volume of the slurry, thereby forming a facecoat about the pattern. The pattern with the facecoat is then serially immersed in at least one second slurry, which may be the same slurry or a different slurry than the first slurry, wherein such slurry comprises refractory material and from about 0 to about 30 volume percent inorganic binder based on the volume of the slurry. The facecoat and/or shell is then infiltrated with a non-silica binder.

The shells produced by the method are useful for casting metal articles. The method for casting metal articles comprises forming a shell as discussed above, including infiltrating the refractory material comprising the facecoat and/or shell with a binder. Thereafter, the pattern is separated from the shell to form a shell having an internal void in the shape of an article to be cast. Molten metal is then introduced into the void, and allowed to solidify. The shell is then separated from the metal article.

Not only does the present invention allow the production of slurries with substantially increased shelf lives, but it also results in the production of shells having physical properties at least as good, if not better, than shells produced by conventional methods. Green strength is one example of a physical property that is increased by the present infiltration method. Bars that were infiltrated with colloidal silica binder had green strengths of about 1100 psi at 10 v/o (volume) binder content. Shells made by conventional methods using the same materials had green strengths of only about 550 psi at the same silica binder concentration.

Improved high-temperature shell stability also can be achieved using the infiltration method. High-temperature stability of shells made by the present invention has been evaluated. Test bars infiltrated with zirconium ammonium carbonate solution were prepared and subjected to creep testing, which is a measure of high-temperature stability. Creep was reduced to nearly half in these test bars relative to bars made by conventional methods.

Another benefit of the present invention is that shell knockout can be improved (i.e., the force and/or time required to separate the shell from the cast metal article can be reduced) using the present infiltration method. Moreover, the infiltration process allows for substantial improvement in shell knockout without increasing the occurrence of shell creep.

DETAILED DESCRIPTION OF THE PREFERRED EMBODIMENTS

Figure 1:
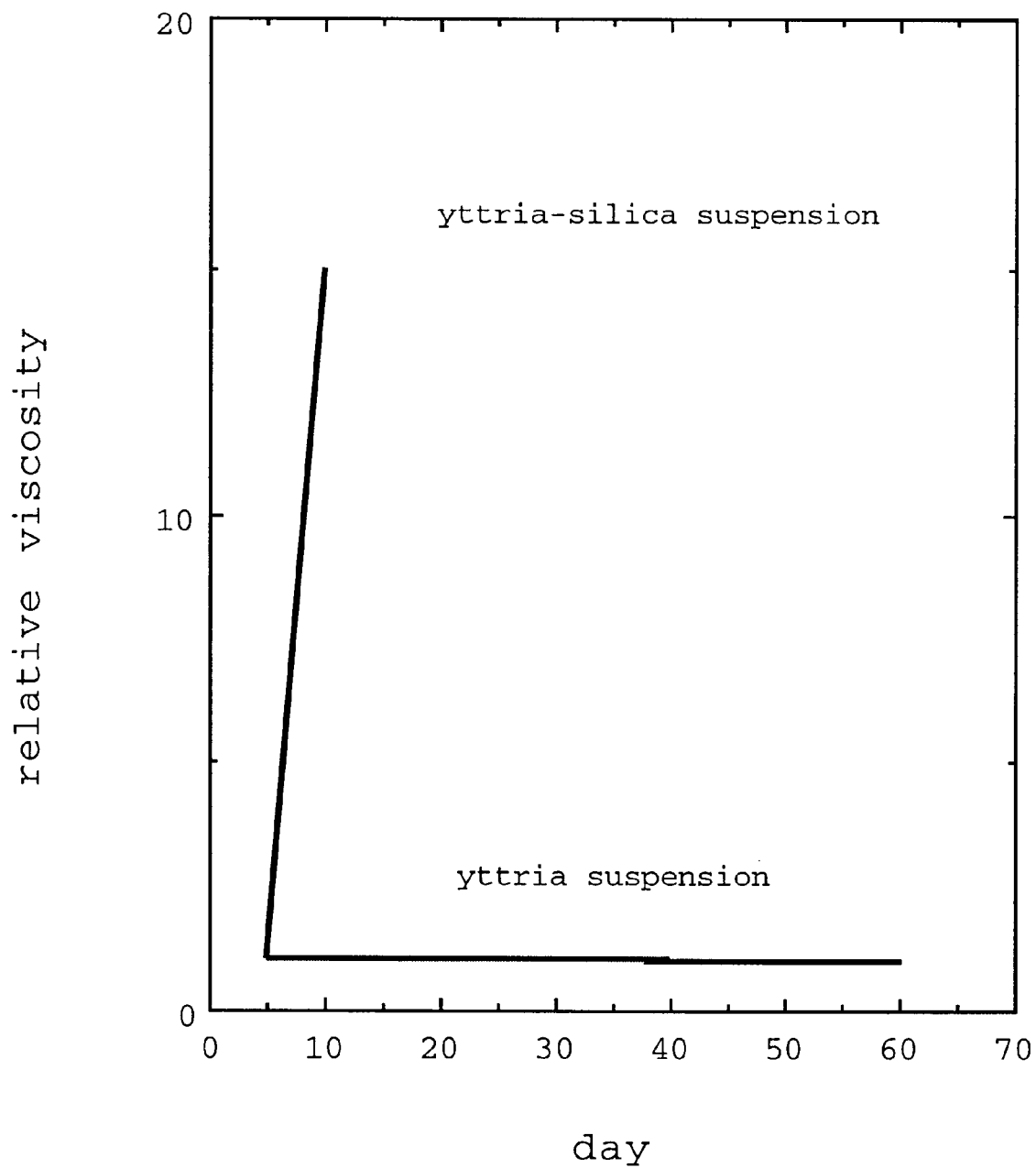
FIG. 1 is a graph illustrating the relative viscosity over time for a yttria suspension and a yttria-silica suspension.

The present invention departs from known methods for producing shells for investment casting in at least two significant ways. First, the slurries containing refractory materials that are used to form the investment casting shells are formulated so as to be devoid, or at least substantially devoid, of inorganic binders. As used herein, substantially devoid means that the slurries contain from about 0 to less than about 30 volume percent inorganic binder. However, in order to construct a shell around a pattern, the slurry must contain some type of binding agent in order to form a cohesive refractory layer about the pattern. This can be accomplished by adding a small amount of inorganic binder and/or organic binder to the investment casting slurry.

Second, once at least one refractory slurry layer coats the pattern, the pattern is then immersed in a binder infiltrating system for a period of time sufficient to infiltrate the shell with an amount of a binder effective to provide sufficient green strength, and/or to reduce the creep in the shell, and/or to reduce the time and effort associated with shell knockout, relative to known methods. The binder infiltrating system can comprise any material useful as a binder, including without limitation, binder slurries, such as slurries of metal oxides, non-oxides, metal salts, neat liquid binders, binder emulsions, and systems comprising mixtures of binders. The binder infiltrating system can be either totally substituted for conventional binder systems used in most commercial investment casting slurries, or can be partially substituted for the conventional binder. In other words, the concentration of inorganic binder used in the investment casting slurry may be reduced substantially relative to that used in conventional casting methods. It is not necessary that the mold be dipped into an infiltrating binder system after the first and each subsequent layer that is placed about the pattern by serially dipping the pattern into slurries.

By removing the inorganic binder from the investment casting slurry, slurry aging is reduced and the lifetime of investment casting slurries is increased. The present method also improves the physical properties, such as increased green strength and decreased creep, of shells made by the method. Moreover, shell knockout can be improved.

The following paragraphs describe how to make investment casting slurries that are completely or substantially devoid of binder, how to serially coat patterns with one or more of such slurries to form shells, and how to infiltrate the facecoat solely, or facecoat and shell, with binders, particularly inorganic binders. Examples also are provided to demonstrate the results that are achieved by using the infiltration method described herein relative to the traditional investment casting process.

I. INVESTMENT CASTING SLURRIES

It should be generally understood that the present method is applicable to virtually any process and any slurry now known or hereafter discovered for producing shells for investment casting. The following paragraphs provide details concerning particular components of slurries and methods for forming shells using such slurries, but the invention is not limited to the particular features described.

Slurries are known in the art of investment casting. Virtually any known slurry can be used to practice the present invention, if such slurry is modified to substantially reduce or eliminate the inorganic binder from the slurry. The investment casting slurries used for the present invention generally, but not necessarily, are aqueous-based suspensions of refractory materials. Such slurries may include an organic binder, and may also include minor portions of inorganic binders. For simplicity, the following discussion will focus on the formation of aqueous slurries. It should be understood, however, that an organic material, such as a lower alkyl alcohol, can be used to form investment casting slurries.

A. Flours

Slurries useful for investment casting include particles of refractory materials that are referred to herein as flours. A refractory material is any material having a high softening point, and a high melting point. The flours used to form the slurry might comprise refractory materials such as, without limitation: metal oxides, including yttria, zirconia, alumina, silica, zircon, alumino silicates, and mixtures thereof; non-oxides, such as silicon carbide, tungsten metal, and mixtures of such materials; and mixtures of metal oxides and non-oxides.

B. Organic Binder

An organic binder may be added to slurries of the present invention to aid in the formation of shells. A partial list of suitable organic binders would include acrylic-based emulsions, vinyl chloride emulsions, vinyl pyridine emulsions, polyethylene glycols, polyethylene oxides, polyvinyl alcohols, polyacrylic acids, polymethacrylic acids, polyacrylamides, polyvinyl pyrrolidones, alginates, alkyl and hydroxyalkyl celluloses, carboxymethyl celluloses, hydroxyethyl celluloses, hydroxypropyl celluloses, starches, modified starches, and mixtures thereof. A particularly suitable class of organic binders is emulsion binders. Several factors can be considered for selecting an appropriate emulsion binder, including cost, toxicity, and how readily and cleanly the binder can be pyrolyzed. The binder preferably is substantially completely pyrolyzed so that little or no residual binder combustion products are left on the finished product. The charge associated with the binder and its film-forming temperature also may be important. Preferably, the binder should have an anionic or nonionic charge and should form a continuous film at ambient temperatures, such as a temperature of less than about 70° F.

The amount of organic binder added to the slurry may vary. However, by way of example, a presently preferred amount of emulsion binder for formulating investment casting slurries typically is from about 1 to about 15 percent, and more typically is from about 1 to about 10 weight percent.

C. Surfactants

A surfactant also may be added to the investment casting slurries, primarily to reduce the surface tension of the slurry. The surfactant enables patterns, particularly wax patterns, that typically are used in the formation of shells, to be wetted by the slurry. To form a mold facecoat, a pattern is dipped into the slurry to wet the pattern with a thin, uniform slurry layer. The surface tension of water is about 73 dynes/cm, whereas a typical surface tension for wax is about 25 dynes/cm. Because the surface tension of water is greater than that of wax, the wax pattern will not be sufficiently wetted by the slurry. A surfactant therefore may be added to the investment casting slurries to reduce the surface tension of the slurry to a level facilitating pattern wetting.

The amount of surfactant added to the slurries of the present invention may vary depending upon the components added to the slurry, the pattern being coated, and the desired properties of shells made using the slurries. However, a presently suitable amount of surfactant for addition to the slurries, based on weight percent, is from about 0.1 weight percent to about 1.0 weight percent. A presently preferred amount of surfactant is about 0.2 weight percent.

D. Antifoaming Agent

Investment casting slurries also may include an antifoaming agent. The addition of different components to the slurry may enhance the formation of bubbles. Hence, an antifoaming agent also may be added to substantially reduce the occurrence of, or substantially eliminate, the formation of bubbles. Virtually any defoamer may be used for the present invention. As with the other components of the slurry, the amount of an antifoaming agent added to the slurry may vary, although the amount of antifoaming agent generally is from about 0.1 weight percent to about 1.0 weight percent.

E. Slurry Viscosity

The viscosity of the slurry typically is adjusted, by increasing or decreasing the water content, each time a new slurry is produced. A slurry viscosity suitable for the present invention is from about 100 centipoise to about 600 centipoise at $0.1\ s^{-1}$, and even more preferably from about 450 to about 550 centipoise.

II. SERIALLY DIPPING PATTERNS IN SLURRIES AND STUCCOING

Patterns in the shape of an article to be cast are dipped plural times into one or more investment casting slurries produced as described above. The slurry material is then coated with stucco material. Stucco materials are known in the art and any such stucco materials can be used. The slurry material having stucco applied thereto is allowed to dry after each dipcoating. Patterns can be made by methods known in the art. The first refractory layer to coat the pattern generally is referred to as a facecoat. The pattern with the facecoat is then reimmersed in suitable investment casting slurries to apply additional backup layers of refractory material to the facecoat. Plural such layers generally are applied to the pattern in order to build a shell about the pattern.

III. BINDER INFILTRATION SYSTEM

Following the first and/or subsequent layer-forming steps comprising dipping patterns into the investment casting slurry, the porous structure provided by the refractory material may then be infiltrated using a binder system comprising a neat binder, such as a liquid binder, a binder emulsion, and/or a binder system. The binder system may comprise an inorganic binder, a combination of two or more different inorganic binders, an organic binder, a combination of two or more different organic binders, and combinations of inorganic binders and organic binders. Working methods generally have used inorganic binders to infiltrate the porous structure defined by the refractory material with binder. Any inorganic or organic binder now known or hereafter discovered can be used to infiltrate the refractory layer or layers with binder.

Without limitation, working embodiments of the invention infiltrated the refractory layer or layers with colloidal silica binders. Additional examples of binders useful for infiltrating the shell layers include, without limitation, metal oxides, such as alumina, yttria, and zirconia, metal salts, metal alkoxides, inorganic polymers, polysilicate binders, alkylsilicate binders, such as ethyl silicate, and mixtures thereof.

A presently preferred inorganic binder is a colloidal silica produced by the DuPont Chemical Company. DuPont sells this material as Dupont Ludox SM.

The amount of binder added to the binder system may vary. Perhaps the best way to determine the amount of binder to be used for a particular application is to empirically determine the binder concentration in the binder system, and amount of binder infiltrated into the shell, that provides the desired results. This can be done by considering the physical characteristics desired in the shell (e.g., green strength, mold knockout, etc.) Presently, a preferred amount of colloidal silica in the binder system is from about 5 weight percent to about 50 weight percent, and even more preferably from about 20 weight percent to about 30 weight percent.

IV. INFILTRATING SHELL LAYERS WITH BINDER

The binder can be infiltrated into the shell simply by dipping the shell into the binder system. The amount of time that the shell is immersed in the binder system may have a profound impact upon the physical characteristics of the shell. A first method for infiltrating the shell with a binder system comprises simply immersing the shell into the binder system for a period of time sufficient to provide the desired results. Best results currently appear to be obtained if the shell is immersed in the binder system for a period of at least about ten minutes. More typically, the shell/pattern composite is immersed in the binder system for a period of greater than one hour, and even more typically for periods of from about two to about four hours. These time periods are provided solely as guidance, as the time period required to infiltrate the binder system into the shell depends on a number of factors, including the materials found in the binder system, the size of the flour particles, the size of the binder system particles, shell porosity, thickness of individual refractory layers, and the thickness of the entire shell.

A second method for infiltrating shell layers with a binder comprises first subjecting the pattern coated with at least one, and likely plural, coating layers to reduced pressures, such as by placing the pattern/refractory layer composite article in an evacuated chamber. This helps reduce the pressure exerted by any fluid situated inside the pores of the shell, which tends to preclude the binder system from infiltrating the shell. The shell is immersed into a binder system as discussed above while the shell and the binder system are at pressures less than ambient. The results of using immersion techniques versus vacuum techniques are exemplified more fully in Example 4 below.

V. EXAMPLES

The following examples are provided to exemplify certain aspects of the present invention. These examples should not be construed to limit the invention to the specific features described.

Example 1

This example shows that aqueous yttria slurries generally used for investment casting age very rapidly. A yttria flour having an average particle diameter of about 15 μm was obtained from the Treibacher Company. The flour was added to deionized water with stirring, using a high-shear mixer at 3000 rpm. The weight percent of the flour, based on the total weight of the suspension, was about 80 weight percent. Emulsion binder (Dow 460 NA), surfactant (Aerosol OT), antifoaming agent (Dow Corning 65 Additive) and colloidal silica binder (Du pont Ludox SM) were then added to the slurry with continued stirring.

The weight percent of each material in the resulting slurry is shown below in Table 1.

TABLE 1

| Material | Weight Percent |
| --- | --- |
| deionized water | 5 |
| Emulsion binder (Dow 460NA) | 1.8 |
| surfactant (Aerosol OT) | 0.2 |
| colloidal silica (Ludox SM) | 7.9 |
| yttria flour | 85 |
| defoamer (Dow Corning 65 additive) | 0.1 |

FIG. 1 shows a graph of the relative viscosity of the slurry described above versus time. The relevant curve on FIG. 1 for this example is identified as "yttria-silica suspension." The viscosity of the slurry was measured using a Brookfield table-top viscometer. FIG. 1 shows that slurries made using yttria and colloidal silica binders age rapidly. More specifically, in about 5 days the viscosity increased more than 10 fold. A constant viscosity is desired, and is indicative of a non-aging slurry. Currently, production slurries wherein the viscosity does not vary by much more than ±10 percent are desired.

Example 2

This example illustrates that the aging of yttria slurries can be substantially reduced, i.e., the slurry lifetime can be increased, by reducing or substantially eliminating colloidal silica binders from the slurry. A yttria slurry was made using a yttria flour having an average particle diameter of about 15 μm which was obtained from the Treibacher Company. The flour was added to deionized water with stirring, using a high-shear mixer at 3000 rpm. Thereafter, emulsion binder (Rohm & Haas Roplex HA-8), surfactant (3M Fluorad FC-430), and an antifoaming agent (Dow Corning 65 additive) were added to the slurry with continued stirring.

The relative weight percent of each material in the resulting slurry is shown below in Table 2.

TABLE 2

| Material | Weight Percent |
| --- | --- |
| deionized water | 5.5 |
| latex (Rohm & Haas Roplex HA-8) | 3.2 |
| surfactant (3M Fluorad FC-430) | 0.2 |
| yttria flour | 91 |
| defoamer (Dow Corning 65 additive) | 0.1 |

FIG. 1 shows the relative viscosity of the above slurry versus time as measured using a Brookfield table-top viscometer. The slurry made with no inorganic silica binder had a constant viscosity, and hence did not age, at least for the entire 2 month period tested.

Example 3

This example describes how to construct a shell and how shell green strength changes versus the amount of silica binder in the slurry. A series of slurries were made using −325 mesh zircon flour, 70 mesh alumina sand and colloidal silica binder. The weight-ratio of zircon flour to alumina sand was 2.76. The amount of colloidal silica added to each slurry varied in order to adjust the amount of silica binder. The amount of water used to form the slurries was adjusted such that the slurries had a Zahn viscosity of 4 seconds at number 4 cup.

A wax test bar pattern was formed, and then immersed into the slurry. The wax pattern was removed from the slurry and excess material was allowed to drain from the wax pattern to obtain a uniform coating. Subsequently, the slurry-coated wax pattern was covered with 46 mesh alumina stucco and allowed to dry for twelve hours in an environment of about 70° F. at a relative humidity of 52 percent. Six subsequent coatings were applied in a like manner. A final seal-dip coating was applied using the zircon-alumina slurry described above; however, no stucco was applied after draining.

Figure 2:
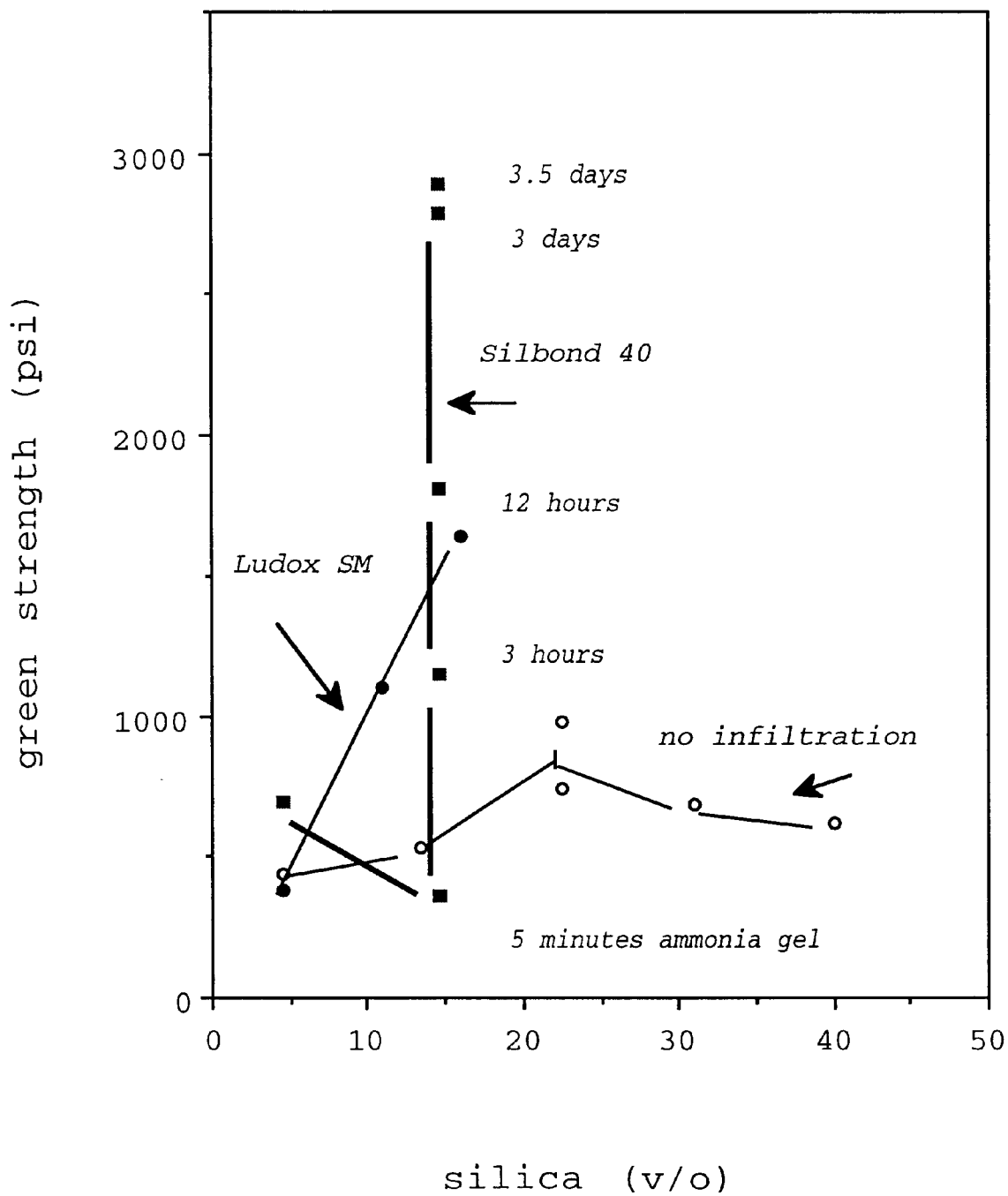
FIG. 2 is a graph illustrating green strength as a function of silica concentration.

After the shell was formed as described above, test bars were cut to 5×1 inches and were removed from the pattern wax. These bars were then dried at 75° C. for 4 hours using a heated oven and then tested for strength with a three-point bend set up. FIG. 2 shows that as the amount of binder in the slurry increases, the strength increases up to a critical binder concentration. Above the critical binder concentration, the strength decreases.

Example 4

Figure 3:
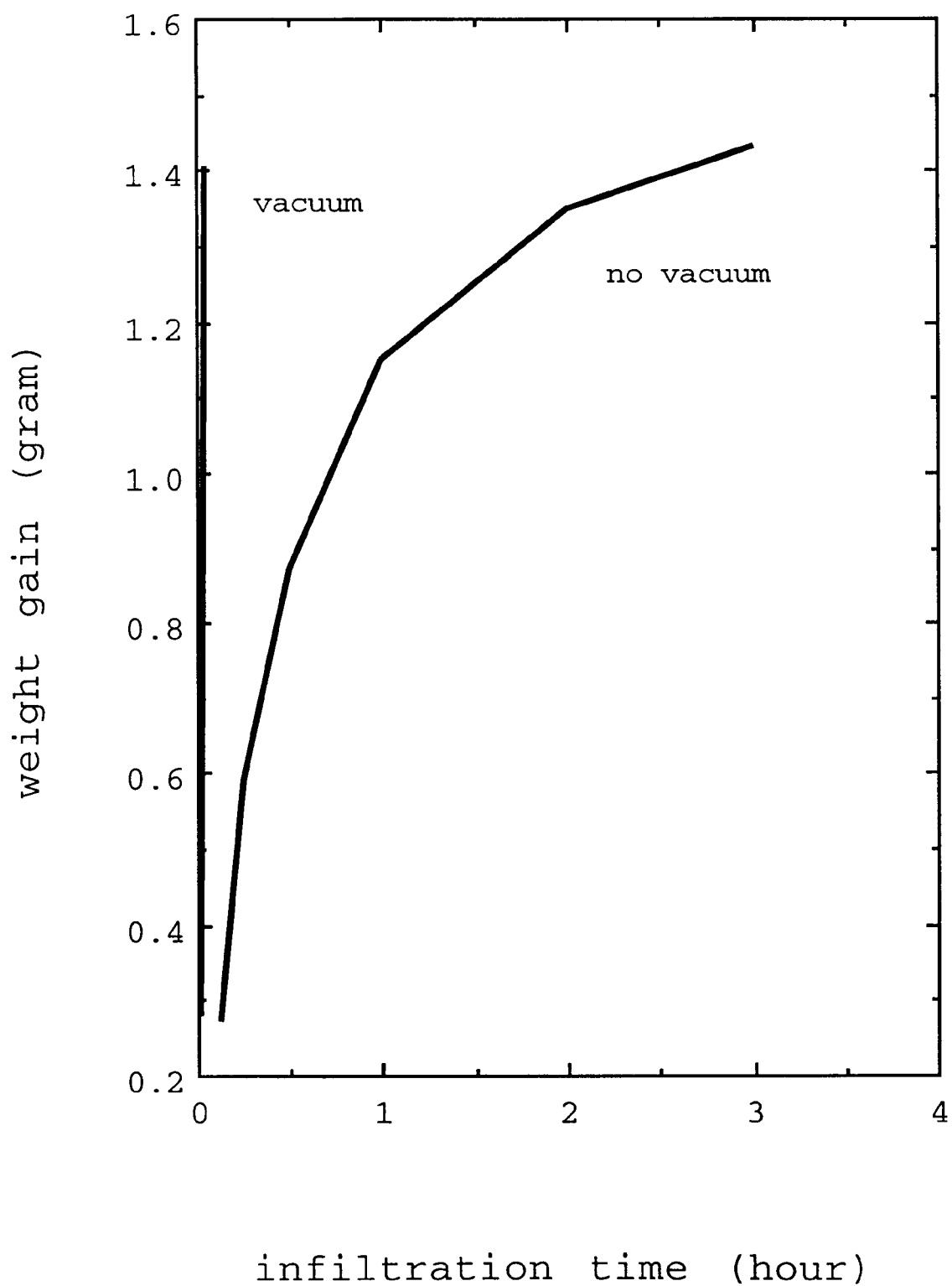
FIG. 3 is a graph illustrating weight gain in grams over time for a shell subjected to vacuum and non-vacuum infiltration processes according to the present invention.

This example describes the infiltration kinetics for infiltrating shells with colloidal silica binder into a shell. A shell was first made with 4 v/o silica as described above in Example 3. The shell was dried by placing it in an oven heated to a temperature of about 40° C. for a period of about 3 hours. After the shell was completely dried, it was then hung from a weighing balance. The shell was then immersed in a tank of Ludox SM and the weight gain associated with infiltrated silica binder was recorded versus time. FIG. 3 illustrates that it takes several hours before a half-inch thick shell is completely infiltrated with binder. Without limiting the present invention to one theory of operation, it currently is believed that the reason for this protracted infiltration time is that air is compressed behind the infiltrating front and it takes time before the air can relocate.

This situation can be alleviated by subjecting the shell and the binder slurry to a vacuum in a vacuum chamber at a pressure of about 30 mm Hg. This pressure was maintained for a period of about 15 minutes. The data illustrated by FIG. 3 indicates that in about 5 minutes the shell can be substantially completely infiltrated, as compared to at least about 4 hours when simple immersion is used as the infiltrating procedure.

Example 5

This example describes how green strength of a shell can be improved by the infiltration process. Test bars were constructed according to the procedure of example 4 using 5 volume percent (v/o) colloidal silica binder. The bars were then infiltrated with Ludox SM, or ethyl silicate binder (SILBOND 40, obtained from Silbond Corporation). For infiltration with colloidal silica, some of the bars were dried, after the first infiltration, for 12 hours at room temperature. The infiltration process was then repeated to investigate the effect of double infiltration. The results are illustrated in FIG. 2, which shows that infiltration substantially increases green strength. Bars that were infiltrated with Ludox SM had green strengths of about 1100 psi at 10 v/o binder content. Shells made by the conventional method, i.e., using investment casting shells having inorganic binder, had green strengths of only about 550 psi at the same silica binder concentration.

Double infiltration sequences also increased the green strength of the shells. After the second infiltration at 16 v/o binder content, shells had green strengths of about 1650 psi. This is compared with about 400 to about 1,000 psi for shells made by conventional methods. It is apparent from this range of strengths that the shell strength depends upon a number of factors. However, the important point is that the strength of shells produced by the present method can be increased relative to a shell produced using the same materials by conventional methods.

Bars that were infiltrated with ethyl silicate binder initially showed lower green strengths. This is not unexpected, because the ethyl silicate binder dissolves some of the colloidal silica binder. This is believed to reduce the bonding between binder particles. However, after the bars were placed in an ammonia gas chamber, the strength gradually increased. Ammonia gelation of ethyl silicate binder is well known in the industry and causes polymerization of hydrated silicon alkoxide molecules, which results in three dimensional bond formation. FIG. 2 shows that bars infiltrated with only 14.5 v/o ethyl silicate binder, and subsequently subjected to ammonia gel treatment, had green strengths of about 2800 psi.

One problem encountered when using ethyl silicate binder in investment casting is that alcohol is used as the media for dissolving the binder in the slurry. Companies that still use ethyl silicate binder must use large quantities of alcohol and may be required to closely control its disposal. The infiltration method, as was illustrated in this example, eliminates the need to use alcohol as a solvent because ethyl silicate, which is a liquid, can be used for infiltration. Therefore, the total amount of alcohol is limited to only a small amount that is produced by hydrolysis of ethyl silicate molecules.

Example 6

Figure 4:
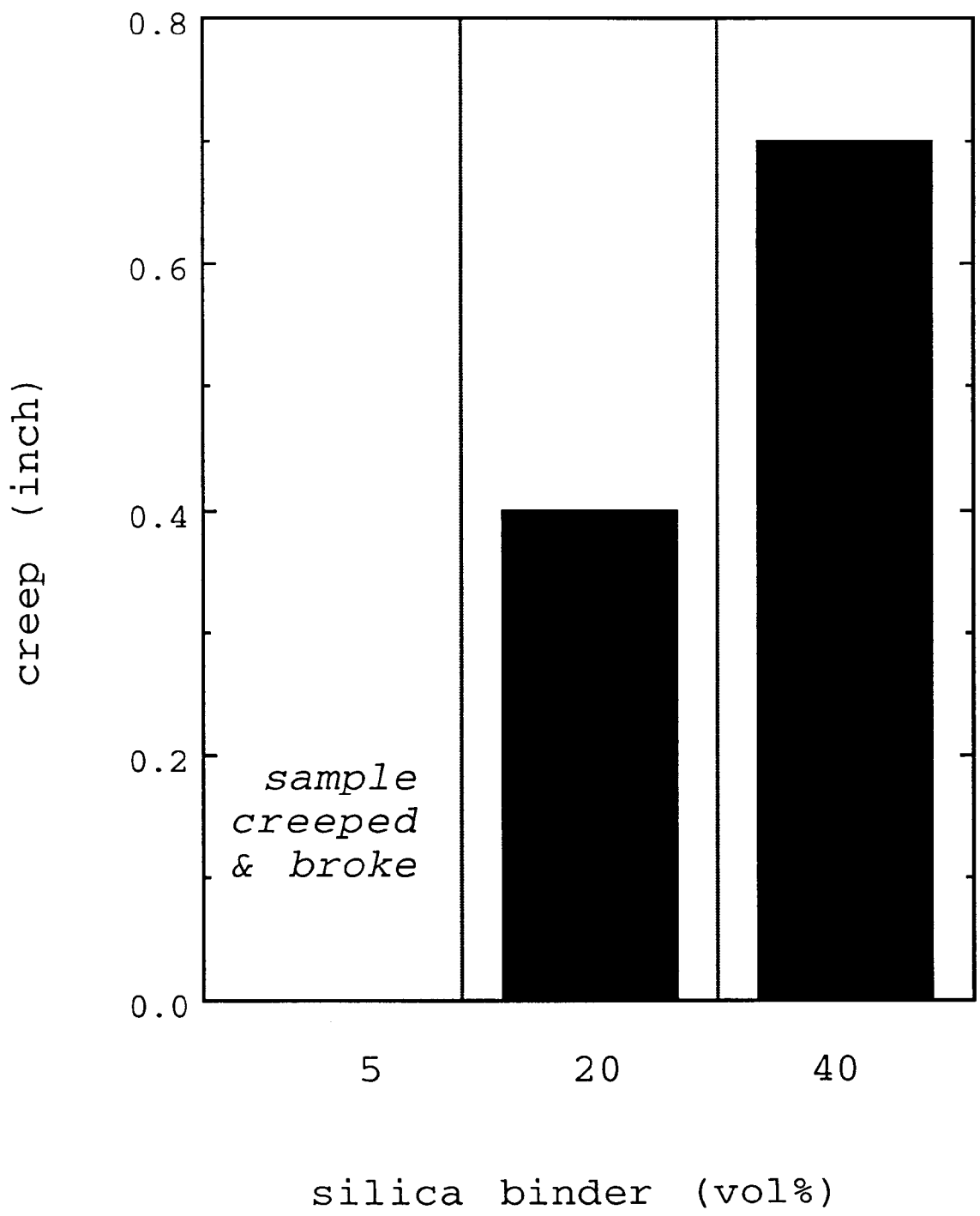
FIG. 4 is a graph illustrating shell creep, in inches, as a function of silica concentration in the slurry.

This example demonstrates how creep can be minimized in the conventional shell making process. Test bars were prepared according to Example 4 with 5, 20 and 40 v/o binder, and then the bars were fired at 1200° C. for 4 hours. After the bars were cooled down, they were creep tested at a pressure of about 80 psi at 1300° C. for 5 hours. The results of the creep test are illustrated in FIG. 4. Bars with 5 v/o binder creeped significantly, and finally broke under the exerted pressure before the end of the experiment. Bars with 40 v/o binder also showed significant creep. Bars with 20 v/o binder exhibited the smallest creep. These bars are in a region of FIG. 2 where the green strength is close to the maximum.

Example 7

Figure 5:
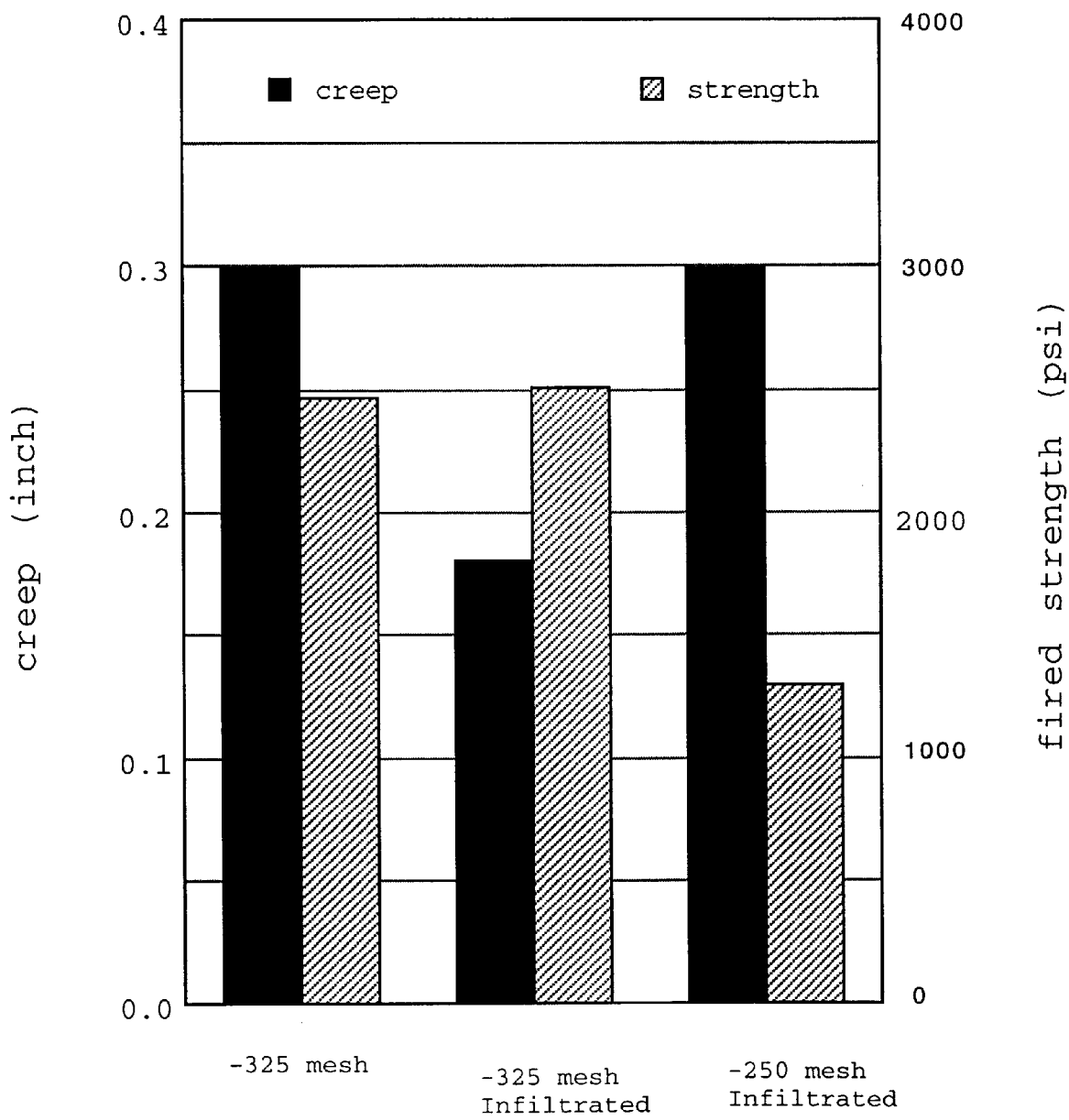
FIG. 5 is a graph illustrating creep, in inches, and fired strength in pounds per square inch as a function of mesh size of the flour and infiltration versus non-infiltration processes.

This example shows how creep can be further reduced by the infiltration method. Test bars produced according to Example 6 with 20 v/o binder were infiltrated with zirconium ammonium carbonate solution (BACOTE 20, MEI, Inc.). Zirconium ammonium carbonate was used because, following heat treatment, it precipitates as small crystalline inclusions inside the matrix of amorphous silica binder. After infiltration, samples were prepared and subjected to creep testing similar to that described for Example 6. FIG. 5 shows that creep was reduced to nearly half in these test bars. At the same time, fired strength was 2509 psi which is very similar to uninfiltrated bars.

Example 8

This example illustrates how shell knockout can be improved through the infiltration method without increasing shell creep. Creep test bars were made according to Example 4 using 20 v/o Ludox SM. However, instead of −325 mesh flour, a coarser −250 mesh zircon flour was used. Test bars then were infiltrated with zirconium ammonium carbonate solution as described above in Example 7 and then creep tested as described for Example 7. FIG. 5 shows that creep in these bars was similar to uninfiltrated bars made with −325 mesh flour. However, fired strength was reduced to almost one half. It should be understood that a reduction in green strength, in most cases, directly correlates with easier shell knockout.

Example 9

This example illustrates how investment casting shells with a silica-free facecoat can be prepared using the infiltration method. A slurry was made according to Example 2. A test-bar wax pattern was then coated with this slurry. Next, the coating was dried and consequently was infiltrated with NYACOL colloidal yttria which was obtained from The PQ Corp., or BACOTE 20, or NYACOL colloidal zirconia, which also were obtained from The PQ Corp. After four hours of drying, three more layers were applied to the shell using the slurry of Example 4 with 20 v/o Ludox SM. Test bars were then dried and fired at 1100° C. for 3 hours. None of the bars showed any facecoat chalkiness.

Example 10

Figure 6:
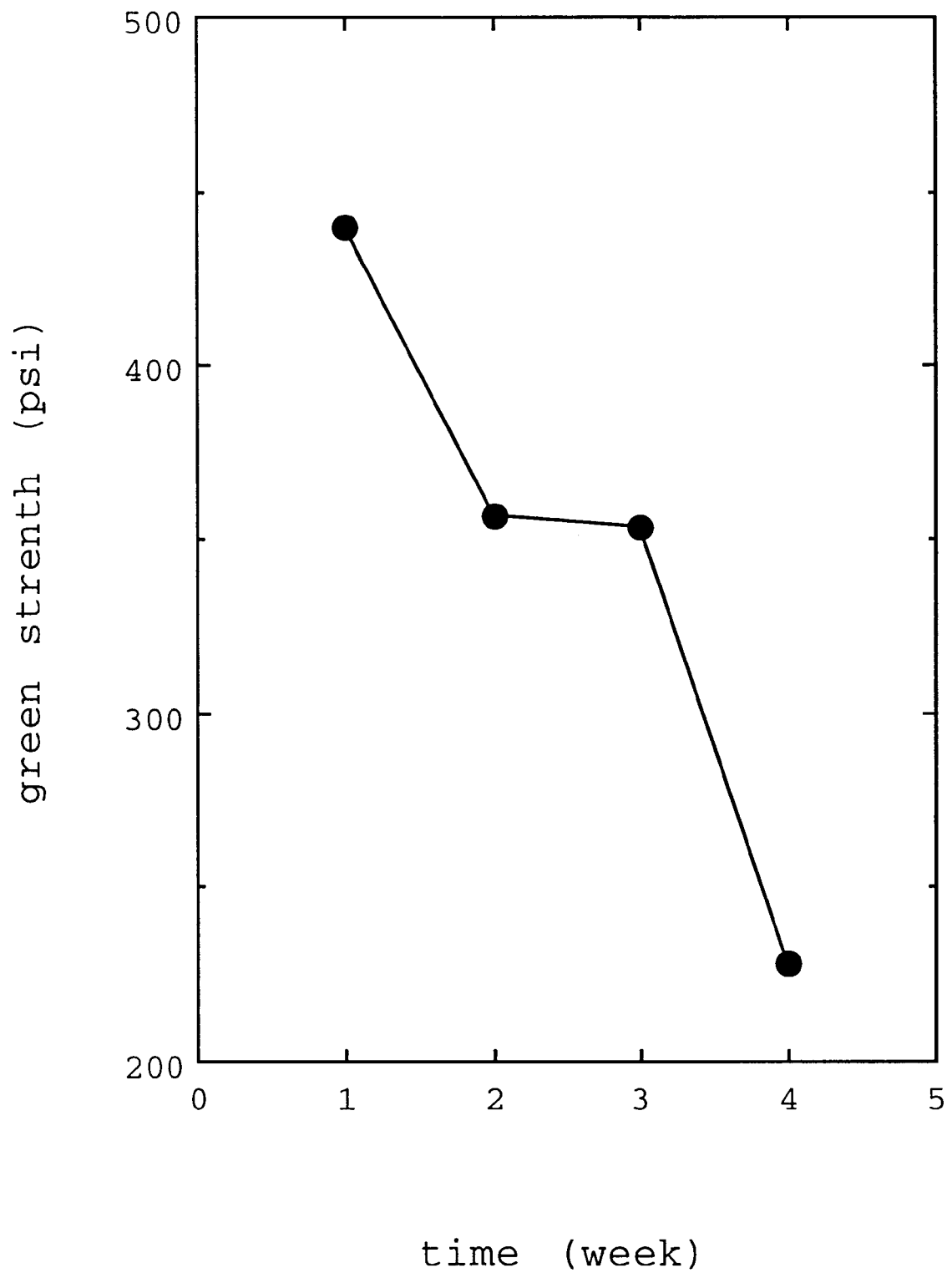
FIG. 6 is a graph illustrating the deterioration in green strength over time for shells made by conventional methods.

This example illustrates that shell green strength deteriorates over time when using conventional investment casting slurries. A slurry having 5 v/o colloidal silica was made as stated in Example 3 and placed in a 20-inch slurry container. Test bars were made in a manner stated above in Example 3 for four weeks following the initial formation of the slurry. The green strengths of test bars made over this four-week period using the slurry were then tested by the three-point bend method. The results are illustrated in FIG. 6. FIG. 6 shows that the green strength of shells made by conventional methods decreases over time. More specifically, FIG. 6 shows that, with the particular shells made using a conventional slurry, green strength decreased from an initial value of about 450 psi to about 225 psi over a period of four weeks. In contrast, shells made by the present infiltration method maintain about 80% of the initial green strength over the same period of time.

The preceding invention has been described with respect to certain preferred embodiments. It will be apparent to those of ordinary skill in the art that the invention may depart from that described herein, and still be within the scope of the following claims. We claim all inventions and modifications coming within the scope of the following claims.

We claim:

1. A method for forming shells for investment casting, comprising:

providing a pattern in the shape of an article to be cast;

serially immersing the pattern in at least one slurry comprising refractory material and a binder selected from the group consisting of greater than 0 to about 30 volume percent inorganic binder, greater than 0 to about 30 volume percent organic binder, and greater than 0 to about 30 volume percent of a mixture of organic and inorganic binders, the volume percent based on the volume of the slurry, each immersion forming a porous layer of refractory material on the pattern, the amount of binder being sufficient to avoid the necessity of infiltrating each refractory material layer after each immersion step; and infiltrating the refractory material with binder.

2. The method according to claim 1 wherein the step of immersing the pattern in one or more slurries comprises immersing the pattern in slurries having the same composition.

3. The method according to claim 1 wherein the step of immersing the pattern in one or more slurries comprises immersing the pattern in at least two slurries having different compositions.

4. The method according to claim 1 wherein at least one of the one or more slurries includes an organic binder.

5. The method according to claim 4 wherein the organic binder is an emulsion binder.

6. The method according to claim 1 wherein at least one of the one or more slurries has about 0 volume percent inorganic binder, and wherein such slurry further comprises an organic binder in an amount effective for forming a facecoat or shell about the pattern.

7. The method according to claim 1 wherein the refractory material comprises metal oxides.

8. The method according to claim 1 wherein the refractory material comprise particles of alumina, zircon, zirconia, yttria, silica, alumino silicates, and mixtures of such materials.

9. The method according to claim 1 wherein the step of infiltrating comprises immersing the pattern having refractory material into a binder system.

10. The method according to claim 1 wherein the step of infiltrating comprises immersing the pattern having refractory material into a binder system for a period of at least about 10 minutes.

11. The method according to claim 1 wherein the binder is selected from the group consisting of inorganic binders, emulsion binders, and mixtures thereof.

12. The method according to claim 11 wherein the inorganic binder is selected from the group consisting of metal oxides, metal salts, metal alkoxides, inorganic polymers, polysilicates, alkylsilicates, and mixtures thereof.

13. The method according to claim 12 wherein the metal oxide binders are selected from the group consisting of silica, yttria, alumina, zirconia and mixtures thereof.

14. The method according to claim 1 wherein the refractory material has a porosity, and the step of infiltrating comprises immersing the pattern having refractory material into a binder system for a period of time sufficient to infiltrate from about 10 to about 100 volume percent of the porosity with binder.

15. The method according to claim 1 wherein the refractory material has a porosity, and the step of infiltrating comprises subjecting the pattern having the refractory material to a pressure less than ambient while immersing the pattern having the refractory material in a binder system for a period of time sufficient to infiltrate from about 10 to about 100 volume percent of the porosity with binder.

16. The method according to claim 1 wherein the binder comprises ethyl silicate.

17. The method according to claim 16, and further comprising the step of exposing the pattern having refractory material to ammonia after the step of infiltrating.

18. The method according to claim 1 wherein the binder is a non-silica binder.

19. The method according to claim 1 wherein the step of serially immersing comprises immersing the pattern in a first slurry comprising refractory material and greater than 0 to about 30 volume percent inorganic binder based on the volume of the slurry, thereby forming a facecoat about the pattern;

immersing the pattern having a facecoat in the first slurry or at least one additional slurry comprising refractory material to form a shell comprised of a facecoat and at least one backup layer; and wherein the entire shell is infiltrated with binder in one step.

20. A method for forming shells for investment casting, comprising:

providing a pattern in the shape of an article to be cast;

serially immersing the pattern in a at least one slurry comprising refractory material and from about 0 to about 30 volume percent inorganic binder based on the volume of the slurry, thereby forming at least one of facecoat or plural backup layers about the pattern to form a shell; and infiltrating the shell with binder.

21. The method according to claim 20 wherein the method further comprises infiltrating the at least one of the facecoat or plural backup layers with a binder.

22. The method according to claim 20 wherein the step of infiltrating comprises infiltrating the facecoat with binder following formation of the facecoat and infiltrating the shell with binder following formation of one or more of the plural backup layers.

23. The method according to claim 20 wherein the step of infiltrating comprises infiltrating the facecoat with binder following formation of the facecoat and infiltrating the shell with binder following formation of each of the plural backup layers.

24. A method for forming shells for investment casting, comprising:

providing a pattern in the shape of an article to be cast;

immersing the pattern in a first slurry comprising refractory material, thereby forming a facecoat about the pattern;

serially immersing the pattern having the facecoat in at least one second slurry comprising refractory material, thereby forming a facecoat and plural backup refractory layers about the pattern, the facecoat and at least one backup layer defining a shell, and wherein the method includes infiltrating the refractory material with binder following formation of the facecoat and/or infiltrating the refractory material with binder following formation of at least one of the plural backup layers.

25. The method according to claim 24 wherein the step of infiltrating comprises infiltrating with a non-silica binder.

26. The method according to claim 24 wherein the binder is a metal alkoxide, metal oxide, metal salt, inorganic polymer, emulsion binder, or mixtures thereof.

27. The method according to claim 24 wherein the further comprises from about 0 to about 30 volume percent inorganic binder, from about 0 to about 30 volume percent organic binder, or from about 0 to about 30 volume percent of a mixture of organic and inorganic binders, the volume percent based on the volume of the slurry.

28. A method for producing shells for investment casting, comprising:

providing a pattern in the shape of an article to be cast;

immersing the pattern in a first investment casting slurry comprising refractory material and a binder selected from the group consisting of from about 0 to about 30 volume percent inorganic binder, from about 0 to about 30 volume percent organic binder, and from about 0 to about 30 volume percent of a mixture of organic and inorganic binders, the volume percent based on the volume of the slurry to form a facecoat about the pattern;

serially immersing the pattern having the facecoat in at least one second investment casting slurry comprising refractory material and a binder selected from the group consisting of from about 0 to about 30 volume percent inorganic binder, from about 0 to about 30 volume percent organic binder, and from about 0 to about 30 volume percent of a mixture of organic and inorganic binders, the volume percent based on the volume of the slurry, thereby forming a facecoat and plural backup refractory layers about the pattern, the facecoat and at least one backup layer defining a shell; and infiltrating the refractory material with binder following formation of the facecoat and/or infiltrating the refractory material with binder following formation of at least one of the plural backup layers, thereby producing a shell having a green strength that is at least about 20 percent greater than that of a shell produced by conventional, non-infiltration methods using the same materials and with the same amount of binder.

29. The method according to claim 28 wherein the first and second slurries have the same composition.

30. The method according to claim 28 wherein the first slurry has a different composition than the second slurry.

31. A method for forming shells for investment casting, comprising:

providing a pattern in the shape of an article to be cast;

serially immersing the pattern in at least one slurry comprising refractory material; and subjecting the pattern having refractory material to a pressure less than ambient while infiltrating the refractory material with binder.

32. The method according to claim 31 wherein the step of immersing the pattern in one or more slurries comprises immersing the pattern in slurries having the same composition.

33. The method according to claim 31 wherein the step of immersing the pattern in one or more slurries comprises immersing the pattern in at least two slurries having different compositions.

34. The method according to claim 31 wherein the refractory material comprises metal oxides.

35. The method according to claim 31 wherein the refractory material comprise particles of alumina, zircon, zirconia, yttria, silica, alumino silicates, and mixtures of such materials.

36. The method according to claim 31 wherein the step of infiltrating comprises immersing the pattern having refractory material into a binder system.

37. The method according to claim 31 wherein the binder is selected from the group consisting of inorganic binders, emulsion binders, and mixtures thereof.

38. The method according to claim 31 wherein the refractory material has a porosity, and the step of infiltrating comprises immersing the pattern having refractory material into a binder system for a period of time sufficient to infiltrate from about 10 to about 100 volume percent of the porosity with binder.

39. The method according to claim 31 wherein the further comprises from about 0 to about 30 volume percent inorganic binder, from about 0 to about 30 volume percent organic binder, or from about 0 to about 30 volume percent of a mixture of organic and inorganic binders, the volume percent based on the volume of the slurry.

40. A method for forming shells for investment casting, comprising:

providing a pattern in the shape of an article to be cast;

serially immersing the pattern in at least one slurry comprising refractory material and greater than 0 to about 30 volume percent organic binder, based on the volume of the slurry, wherein each immersion results in the formation of a porous layer of refractory material on the pattern; and infiltrating the refractory material with an amount of binder such that it is not necessary to infiltrate each layer after each immersion step.

41. The method according to claim 40 wherein the refractory material are selected from the group consisting of silica, yttria, alumina, zirconia and mixtures thereof.

42. The method according to claim 41 wherein the organic binder is an emulsion binder.

43. The method according to claim 41 wherein the binder comprises ethyl silicate.

44. The method according to claim 41 wherein the binder is selected from the group consisting of metal oxides, metal salts, metal alkoxides, inorganic polymers, polysilicates, alkylsilicates, and mixtures thereof.

45. The method according to claim 41, and further comprising the step of exposing the pattern having refractory material to ammonia after the step of infiltrating.

46. A method for casting metal articles, comprising:

providing a pattern in the shape of an article to be cast;

immersing the pattern in a first slurry comprising refractory material and greater than 0 to about 30 volume percent inorganic binder based on the volume of the slurry, thereby forming a facecoat about the pattern;

serially immersing the pattern having a facecoat into at least a second investment casting slurry comprising from about 0 to about 30 volume percent inorganic binder, from about 0 to about 30 volume percent organic binder, or from about 0 to about 30 volume percent of a mixture of organic and inorganic binders, the volume percent based on the volume of the slurry, thereby forming a facecoat and plural backup layers about the pattern, the facecoat and at least one backup layer defining a shell, the refractory material about the pattern having a porosity;

infiltrating the refractory material with binder following formation of the facecoat and/or infiltrating the refractory material with binder following formation of at least one of the plural backup layers, wherein the step of infiltrating continues for a period of time sufficient to infiltrate from about 20 percent to about 100 percent of the porosity with inorganic binder, the inorganic binder being selected from the group consisting of metal oxides, metal salts, metal alkoxides, inorganic polymers, polysilicates, alkylsilicates, emulsion binders, and mixtures thereof;

removing the pattern, thereby forming a shell having an internal void in the shape of an article to be cast; and introducing molten metal into the void.

47. The method according to claim 46 wherein the step of infiltrating comprises immersing the pattern having the facecoat and/or the shell into a binder system for a period of at least about 10 minutes.

48. The method according to claim 46 wherein the step of infiltrating comprises subjecting the pattern having the facecoat and/or the shell to a pressure less than ambient while the pattern having the refractory material is immersed in a binder system.

49. The method according to claim 46 wherein the first and second investment casting slurries have the same composition.

50. The method according to claim 46 wherein the first slurry has a different composition than the second slurry.

51. The method according to claim 46 wherein plural slurries having different compositions are used to form the shell.

* * * * *

UNITED STATES PATENT AND TRADEMARK OFFICE
CERTIFICATE OF CORRECTION

PATENT NO. : 5,927,379
DATED : July 27, 1999
INVENTOR(S) : Yasrebi et al.

It is certified that error appears in the above-identified patent and that said Letters Patent is hereby corrected as shown below:

Title page,
Item [56], References Cited, FOREIGN PATENT DOCUMENTS,
"0383164 A1" should read -- 0383164 EP B1 --.
Item [57], ABSTRACT, please add:
-- The method allows formation of investment casting slurries that do not contain inorganic binder, or allows for the formation of slurries having only small concentrations of inorganic binder. Forming investment casting slurries having no binder or small concentrations of binder substantially extends the lifetime of such slurries. Moreover, the method provides shells having good green strength, relatively casy shell knockout, and acceptable creep. --

Signed and Sealed this

Seventh Day of June, 2005

JON W. DUDAS
*Director of the United States Patent and Trademark Office*